US005799485A

United States Patent [19]

Sandau

[11] Patent Number: 5,799,485

[45] Date of Patent: Sep. 1, 1998

[54] ELECTROHYDRAULIC CONTROL DEVICE FOR DOUBLE-ACTING CONSUMER

[75] Inventor: Hartmut Sandau, deceased, late of Schwieberdingen, Germany, by Rosatha Sandau and Christine Sandau, legal representatives

[73] Assignee: Robert Bosch GmbH, Stuttgart, Germany

[21] Appl. No.: 796,921

[22] Filed: Feb. 6, 1997

[51] Int. Cl.[6] .............................. F16D 31/02; F15B 13/04

[52] U.S. Cl. .................................. 60/452; 91/448; 91/455

[58] Field of Search .............................. 91/421, 445, 446, 91/447, 448, 454, 455; 60/452

[56] References Cited

U.S. PATENT DOCUMENTS

| | | | |
|---|---|---|---|
| 2,650,609 | 9/1953 | Herbst | 91/448 |
| 2,671,433 | 3/1954 | Meddock | 91/446 |
| 2,804,883 | 9/1957 | Curlett | 91/446 |
| 3,906,980 | 9/1975 | Hanser et al. | 91/455 |
| 4,096,784 | 6/1978 | Ongaro | 91/455 |
| 5,211,196 | 5/1993 | Schwelm | 91/454 |

FOREIGN PATENT DOCUMENTS

| | | | |
|---|---|---|---|
| 0110126 A1 | 10/1983 | European Pat. Off. . | |
| 4140604A1 | 6/1993 | Germany . | |
| 47506 | 3/1984 | Japan | 91/448 |

*Primary Examiner*—F. Daniel Lopez
*Attorney, Agent, or Firm*—Michael J. Striker

[57] ABSTRACT

An electrohydraulic control device (10) for a double-acting consumer (11) is proposed, in which a continuous volumetric flow control to and from the consumer (11) is possible with two proportional 4/2-way magnet valves (12, 13), each with one seat valve function (26), and by means of two blocking valves (29, 38) of the seat valve type; free floating is attainable as the fourth work position. The magnet valves (12, 13) are structurally identical and are each connected into the volumetric flow to the consumer and the volumetric flow leaving the consumer; each consumer connection (28, 36) is sealed off tightly by a seat valve function (26) of the magnet valves (12, 13) and a blocking valve (29, 38). The magnet valves (12, 13) have a main control member (57) and a pilot control member (58), which cooperate in the manner of a followup controller and make do without a separate control oil supply, so that high hydraulic capacities can be controlled continuously and with short response times.

20 Claims, 8 Drawing Sheets

ELECTROHYDRAULIC CONTROL DEVICE FOR DOUBLE-ACTING CONSUMER

BACKGROUND OF THE INVENTION

The present invention relates to electrohydraulic control devices for double-acting consumers.

The invention is based on an electrohydraulic control device for a double-acting consumer. One such electrohydraulic control device is already known from European Patent Disclosure EP 0 110 126 A1, in which to control a double-acting consumer a longitudinally movable control slide can be actuated for a 4/3-way function of two magnets disposed oppositely on the housing. To keep the leakage slight, each consumer connection is secured in the manner of a seat valve by a hydraulically controlled blocking valve. The pilot control of these blocking valves is performed by those tappets that transmit the switching motion of the magnets to the control slide. Along with the functions of raising, holding and lowering, a fourth, free-float position can additionally be attained by briefly exciting both magnets at the same time. Moreover, the control device can also be used to control a single-acting consumer. A disadvantage of this control device, however, is that it works with magnets that merely switch, so that sensitive, proportional volumetric flow control is not possible. Moreover, the embodiment of the tappet as pilot control member makes for a relatively complicated structural design. The disposition of the switching magnets on opposite sides of the housing, in combination with the 4/3-way longitudinal slide and the tappets used for pilot control makes for a very long structure in the slide axis, which makes the control device unfavorable for mobile use.

An electrohydraulic control device is also known from German Patent Disclosure DE 41 40 604 A1; it works with a proportional magnet and is suitable for fine control of volumetric flows. The pilot control valve member disposed in a main valve member is actuated by the proportional magnet and cooperates like a followup controller with the main valve member, so that short response times and hence good regulating behavior are attained. The valve members for the main and pilot control stages are embodied as seat valves, which keeps the leakage slight. The control device is also embodied such that there is no need for a separate control oil supply. An unfavorable aspect of this control device is that it can execute only a 2/2-way function and is therefore unsuitable in this form for controlling a double-acting consumer.

SUMMARY OF THE INVENTION

It is an object of the present invention to provide an electrohydraulic control device for a double-acting consumer of the above-described type which avoids the above-described disadvantages.

According to the invention the electrohydraulic control device for a double-acting consumer includes

- a first and second consumer connection, a first and second work conduit communicating with the first and second consumer connection respectively and including first and second blocking valves for blocking the consumer connections, a first lowering conduit communicating with the second consumer connection and a second lowering conduit communicating with the first consumer connection, each lowering conduit by-passing the blocking valves; and
- electromagnetically actuable control means for blocking or connecting at least one consumer connection, which comprises a first four-way, two-position proportional magnet valve and a second four-way, two-position proportional magnet valve identical to the first four-way, two position proportional magnet valve. Each magnet valve includes a slidable valve member provided with control edges and having an initial position in which the connected work conduit is relieved, an inlet connection, a return connection, a first motor connection alternatively connected to the inlet connection or the return connection by operation of the slidable valve member with the control edges, a second motor connection and valve seat means for controlling, e.g. closing, the second motor connection. The first motor connection of the first magnet valve communicates with the first work conduit and the first motor connection of the second magnet valve communicates with the second work conduit. The second motor connection of the first magnet valve is connected with the first lowering conduit and thus the second consumer connection and the second motor connection of the second magnet valve is connected with the second lowering conduit and thus the first consumer connection.

The electrohydraulic control device according to the invention has the advantage over the prior art that while having a proportional mode of operation, it can control a double-acting consumer with little leakage. The magnet valves, because of the slide drives chosen, enable short response times, which leads to good regulating performance of the control device. The control device can attain a total of four work positions with only two magnets, so that in additional to the usual functions of raising, holding and lowering, a fourth, free-float position is possible by exciting both magnets; the switching sequence is arbitrary. The control device functions without a separate control oil supply and can moreover be used for a single-acting consumer. The control device is also compact in structure and is therefore suitable for mobile applications.

In preferred embodiments of the control device according to the invention used for regulating volumetric flow in each magnet valve the second motor connection is blocked by the seat valve means and the inlet connection is blocked by the slidable valve control member in its initial position and the slidable valve control member has a work position in which the inlet connection communicates with the first motor connection and the second motor connection communicates with the return connection.

Advantageously each slidable valve control member comprises a longitudinally movable main control member and each magnetic valve comprises a pilot-controlled valve including the main control member, a proportional magnet and a pilot control member actuable by the proportional magnet to cooperate with the main control member so as to act as a followup controller. The seat valve means includes a main valve cone disposed on the main control member for blocking the second motor connection and is connected in series with a fine-control edge provided on the main control member for communication with the return connection and the control edges are disposed on the main control member spatially separated from each other.

In a particularly preferred embodiment the main control member has a thickened end portion having an end face defining an end-face pressure chamber adjoining the main control member so that a pressure in this pressure chamber urges the main control member in a closing direction. The pilot-controlled valve includes means for relieving the end-face pressure chamber including a slide edge, a pilot control cone connected in series with the slide edge, the slide edge and pilot control cone being provided on the pilot control member, and a spring arranged to urge the pilot control member in a direction toward the initial position and opposite to another direction of motion of the pilot control member caused by operation of the proportional magnet. The main control member advantageously has at least one differential face and the main control member is urged in an opening direction by a pressure at the second motor connection acting on the at least one differential face. The main control member has a second differential face and is positionable so that a pressure at the inlet connection acts on the second differential face urging the main control member in an opening direction and the pilot-controlled valve includes means for connecting the end-face pressure chamber with the second motor connection or the inlet connection so that the end-face pressure chamber is selectively acted on by a higher pressure at the second motor connection or the inlet connection, and the means for connecting includes check valves and inlet throttles.

The pilot-controlled valve is provided with a slide bore for the main control member. This slid bore includes an inlet chamber, a first motor chamber, a return chamber, an intermediate chamber and a second motor chamber arranged in a preferred embodiment in succession spaced from each other in the slide bore with the inlet chamber being closest to the proportional magnet and the second motor chamber being furthest from the proportional magnet. The connections of the magnet valve are assigned to respective chambers of the slide bore.

In another embodiment of the control device the pilot-controlled valve advantageously includes a housing provided with slide bore through which the main control member is moved. This slide bore includes a return chamber, a second motor chamber, a first motor chamber, an inlet chamber and a magnetic-end pressure chamber arranged in succession with the magnet-end pressure chamber closest to the proportional magnet and the return chamber furthest from the proportional magnet. In this embodiment the main valve cone controls communication with the return chamber, a spring is provided in the return chamber and is arranged to urge the main control member towards the initial position and to press the main valve cone against a valve seat fixed in the housing of the pilot-controlled valve. The magnet-end pressure chamber is bounded by an end of the main control member closest to the proportional magnet so that pressure in the magnet-end pressure chamber urges the main control member in a direction toward a work position against action of the spring. The magnet-end pressure chamber is connected to the return connection via a throttle bore and is connected with the return connection by means of the pilot control member and the proportional magnet is provided with an armature and another spring braced against the housing and holding the pilot control member against the armature of the proportional magnet. Advantageously the main control member is provided with a throttle bore and a damping piston guided slidably in the throttle bore, protruding into the return chamber and provided with a return throttle. The first motor chamber is arranged side-by-side of the second motor chamber, the inlet chamber is located between the first motor chamber and the proportional magnet and an intermediate chamber is located between the second motor chamber and the return chamber.

According to a preferred embodiment the blocking valves each have an inlet-side inlet, a spring-loaded back end, a control connection communicating with the spring-loaded back end and means for transmitting a pressure prevailing at the inlet-side inlet of one blocking valve to the control connection of the other blocking valve and thus to the spring-loaded back end thereof so as to block the other blocking valve. Advantageously each blocking valve is provided with a throttle check valve and the control connections of both blocking valves communicate with each other for transmission of the pressure prevailing at the inlet-side inlet of one blocking valve to the spring-loaded back end of the other. This provides a reliable mode of operation and permits a space-saving, inexpensive structural design.

In one embodiment of the control device that can be used for an LS system the electromagnetically actuable control means includes an alternating valve which has a spring-centered middle position, is connected between the two first motor connections of both magnet valves and has two opposite end connections connected to the respective first motor connections and a middle connection connected to a load pressure line so that, when one end connection of the alternating valve is pressurized, a maximum pressure is transmitted into the load pressure line.

If the proportional magnets are arranged on one side of the housing of the control device, mechanical actuation is possible without major effort. This also results in a compact, space-saving design.

Valve seats are advantageously provided in the housing for the main valve members so that the control device can be manufactured economically.

The two blocking valves and the alternating valve are advantageously arranged in the housing in a region between the two magnet valves in various preferred embodiments. Particularly the magnet valves are arranged with their longitudinal axes in two planes parallel to each other and spaced from each other. The blocking valves are arranged axially parallel in the housing in different transverse planes spaced apart from each other and parallel to each other. The transverse planes are advantageously spaced apart a distance greater than a distance between the longitudinal planes in which the magnet valves are located. The location of the blocking valves in this embodiment leads to a space-saving structure and the resulting shortened conduits are also favorable for regulating performance.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
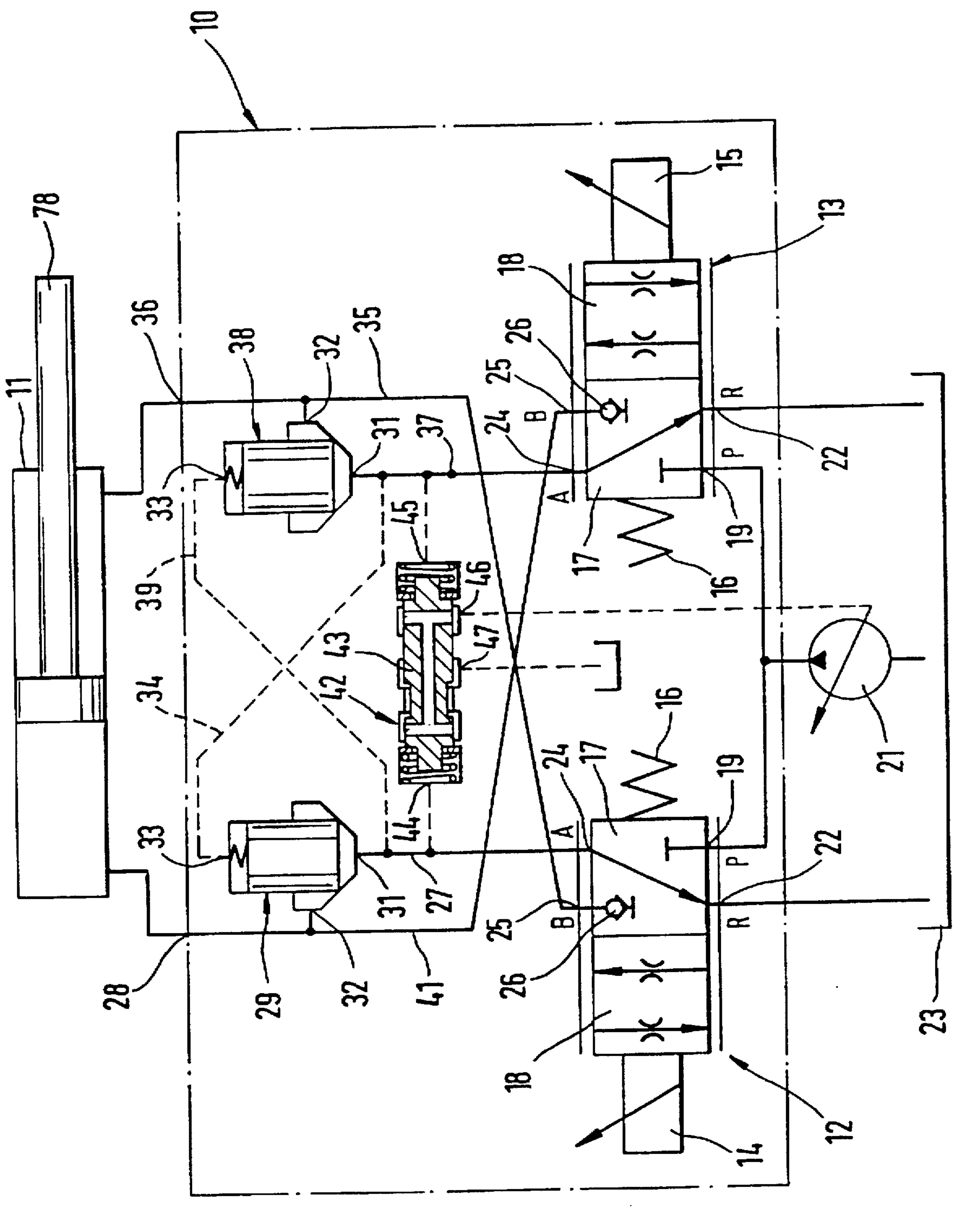
FIG. 1 is a simplified hydraulic circuit diagram of an electrohydraulic control device for a double-acting consumer.

FIG. 1, in a simplified circuit diagram, shows an electro-hydraulic control device 10 for controlling a double-acting consumer 11, of the kind that can be used for LS systems. The control device 10 has a first magnet valve 12 and a structurally identical second magnet valve 13. Both magnet valves 12, 13 are embodied as proportional valves with a four-way, two-position function, which are each actuatable by a respective proportional magnet 14 and 15. Each magnet valve 12, 13 is adjustable by its magnet 14 and 15, respectively, counter to the force of a spring 16, out of its initial position 17 into a work position 18. The volumetric flow is controllable continuously via the magnet valve 12 or 13 in proportion to the electrical input variable.

The magnet valves 12, 13, which are identical to one another, each have an inlet connection 19, designated P. Both inlet connections connected to an adjusting pump 21 that supplies them with pressure fluid. In addition, each magnet valve 12, 13 has a return connection 22, designated R, and the return connections are relieved to a tank 23. Moreover, each magnet valve 12, 13 has a first motor connection 24, designated A, and a second motor connection 25, designated B. In the initial position shown, the inlet connection 19 is hydraulically blocked. The first motor connection 24 communicates with the return connection 22, and the second motor connection 25 is closed by seat valve means 26 of the magnet valve 12, 13. Upon deflection into the work position 18, the inlet connection 19 communicates with the first motor connection 24, while the second motor connection 25 is relieved to the return connection 22, and these communications are continuously controllable.

In the control device 10, a first work conduit 27 leads from the first motor connection 24 at the first magnet valve 12 to a first consumer connection 28. The hydraulically controllable first blocking valve 29 is connected into this work conduit 27. The blocking valve 29 is embodied as a controlled check valve. Its inlet 31 communicates with the first motor connection 24, while its outlet 32 communicates with the first consumer connection 28, while a control connection 33 can be acted upon by pressure via a first control line 34. From the first motor connection 25 of the first magnet valve 12, a first lowering conduit 35 leads to a second consumer connection 36, bypassing the blocking valves.

Similarly to the case of the first magnet valve 12, in the second magnet valve 13 a second work conduit 37 leads from the first motor connection 24 to the second consumer connection 36, and a second blocking valve 38 is connected into this work conduit 37 and is structurally identical to the first blocking valve 29. From the second motor connection 25 of the second magnet valve 13, a second lowering conduit 41 leads to the first consumer connection 28, bypassing the blocking valves 29, 38.

The control device 10 also has an alternating valve 42, whose slide 43 has a spring-centered middle position. The alternating valve 42 is connected by its face-end pressure connections 44, 45 to the first and second work conduits 27 and 37, respectively, in each case upstream of the respective blocking valves 29, 38, while its middle connection 46 reports the maximum load pressure at the time to the adjusting pump 21. If pressure is absent or the pressures are the same relieves this middle connection 46 to a tank connection 47.

Figure 2:
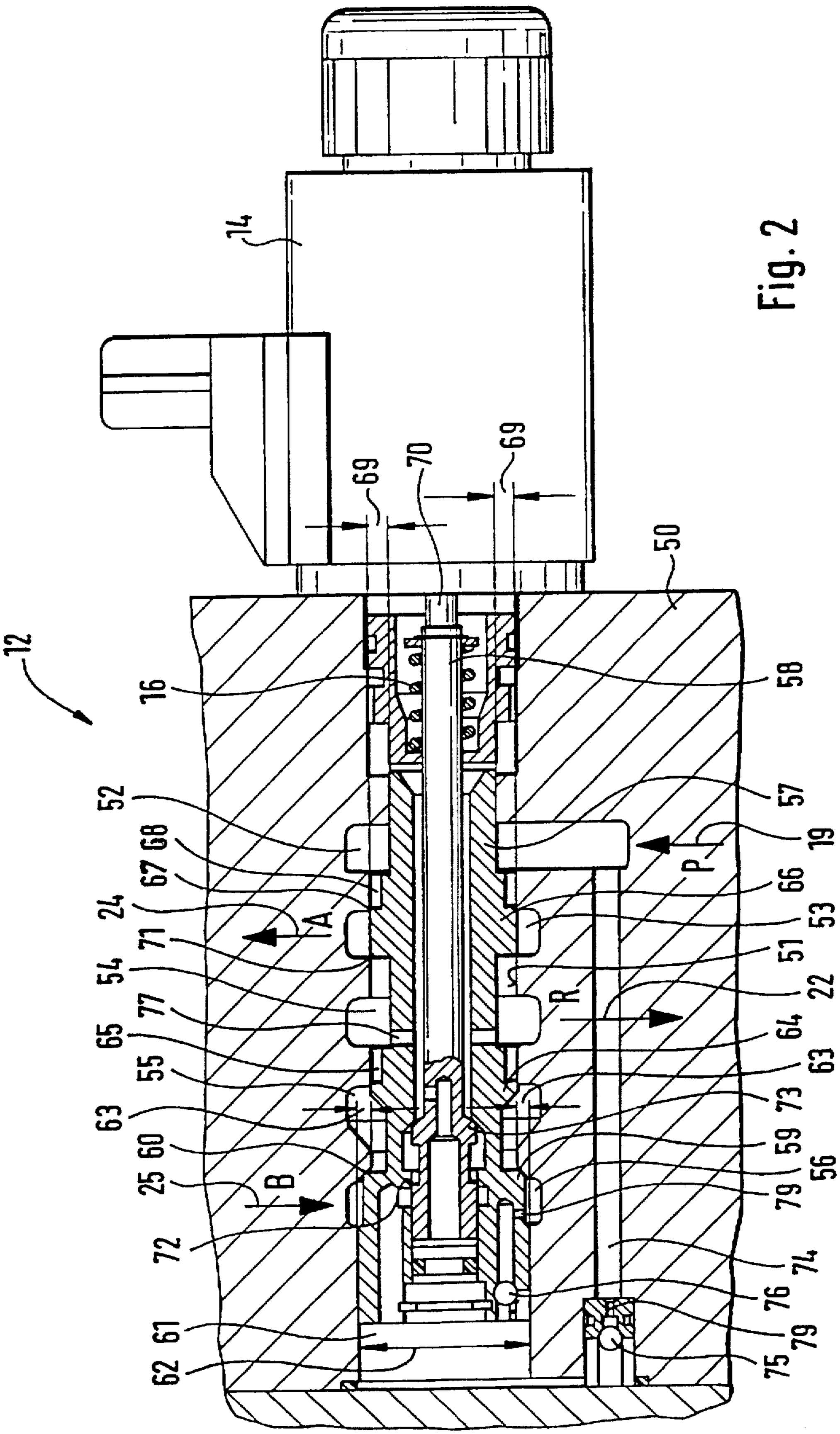
FIG. 2 is a longitudinal cross-sectional view through a proportional magnet valve having a simplified structural design in accordance with the circuit diagram for it in the lower part of FIG. 1.

FIG. 2 shows a longitudinal section through a first magnet valve 12, embodied in simplified structural form, and as shown merely schematically in FIG. 1. The structural design of the control device of DE 41 40 604 A1 is expressly assumed to be known; the essential components and mode of operation can be learned from this reference. In the magnet valve 12 of FIG. 2, elements identical to those of FIG. 1 are provided with the same reference numerals.

In FIG. 2, the magnet valve 12, in a housing 50, has a continuous, repeatedly stepped slide bore 51, in which an inlet chamber 52, a first motor chamber 53, a return chamber 54, an intermediate chamber 55, and a second motor chamber 56 are embodied. These chambers communicate correspondingly with the associated inlet connection 19 (P), the first motor connection 24 (A), the return connection 22 (R), and the second motor connection 25 (B). A main control member 57 is guided in this slide bore 51 and in its interior receives a pilot control member 58, which is actuatable by the armature 70 of the proportional magnet 14 counter to the force of the spring 16. The main control member 57 and pilot control member 58 cooperate in the manner of a followup controller; both control members 57, 58 have a seat valve means for the sake of secure closing of the second motor chamber 56. The main control member 57 to that end has a main valve cone 59, on its end remote from the magnet 14. This cone cooperates with a seat 60 solidly joined to the housing between the second motor chamber 56 and the intermediate chamber 55. With its main valve cone 59, the main control member 57, defines a pressure chamber 61 on its face end, thereby forming a first circular pressure face 62, which urges the main control member 57 in the direction of its initial position 17. In addition, the main valve cone 59 is embodied such that it forms a first differential face 63, which is acted upon by the pressure in the second motor chamber 56 and acts upon the main control member 57 in the opening direction. The communication of the second motor chamber 56 with the return chamber 54 via the intermediate chamber 55 is controlled downstream of the main valve cone 59 by a first piston portion 64 with fine-control chambers 65. On the main control member 57, spaced apart from this first piston portion 64 in the region of the first motor chamber 53, there is a second piston portion 66, which with a second control edge 67 and an associated fine-control groove 68 controls the communication from the inlet chamber 52 to the first motor chamber 53. The end of the main control member 57 is embodied such that it forms a second differential face 69, acted upon by the pressure in the inlet connection 19; on pressurization, together with the first pressure face 63, it urges the main control member 57 in the opening direction. On the main control member 57, the second piston portion 56 has a third control edge 71, which in the initial position 17 shown connects the first motor chamber 53 with the return chamber 54.

For controlling the control oil flow from the pressure chamber 61 to the return chamber 54, the pilot control member 58 has a slide edge 72 that takes on the task of fine control and a pilot control cone 73 that takes on the task of secure sealing; this edge and cone are connected in succession in the control oil flow. The pilot control member 58 is guided with pressures balanced and is urged, by the spring 16 braced solidly against the housing, in the direction of the initial position 17, in which it is braced by its pilot control cone 73 on the associated valve seat in the main control member 57. The pressure chamber 61 can be acted upon in alternation with pressure fluid; the pressure in the inlet chamber 52 can reach the pressure chamber 61 via a longitudinal bore 74 and a check valve 75, fixed to the housing, with an inlet throttle 79. If the load pressure in the second motor chamber 56 is higher, then pressure fluid flows into the pressure chamber 61 via a second check valve 76, disposed in the main valve cone 59 and having the inlet throttle 79. For the outflow of control pressure fluid from the pressure chamber 61 via the pilot control member 58, transverse bores 77 are disposed in the main control member 57 and are located in the region between the two piston portions 64 and 66.

The mode of operation of the electrohydraulic control device 10 will be explained as follows, referring to FIGS. 1 and 2.

In a first, neutral position, the two proportional magnets 14, 15 are without current, and the magnet valves 12 and 13 each assume their respective initial positions 17. Thus their inlet connection 19 is blocked, as illustrated in FIG. 2 by the second control edge 67 on the second piston portion 66. Also in the initial position 17 of each magnet valve 12, 13, the first motor connection 24 is relieved to the return connection 22. In FIG. 2, the third control edge 71 on the second piston portion 66 opens up the communication from the first motor chamber 53 to the return chamber 54. In this initial position 17, the second motor connection 25 is also sealed off by the seat valve function 26 of the magnet valves 12 and 13, in order to keep any leaking oil flow slight. The main valve cone 59 is pressed against the associated valve seat 60 by the pressure prevailing in the pressure chamber 61, since the higher of the pressures prevailing in the second motor chamber 56 or in the inlet chamber 52 can reach the pressure chamber 61 via the check valve 76 and 75, respectively, and there act upon the large pressure face 62. The closing force on the main control member 57 is greater in any case than the opening forces that can be exerted by the pressure in the second motor connection 25 on the first differential face 63 and/or by the pressure in the inlet chamber 55 on the second differential face 69. The pressure chamber 61 is also securely sealed off by the pilot control cone 73 of the pilot control member 58. The pilot control member 58 itself is pressed by the spring 16, against an associated valve seat in the main control member 57.

In this neutral position, the magnet valves 12, 13 relieve their adjacent portions of the work conduits 27 and 37, respectively, so that the inlet 31 at the each blocking valve 29 and 38 is pressureless. Via the control lines 34, 39, whose paths cross one another, the control connections 33 of the two blocking valves 29, 38, are also pressure relieved. The closing members of the blocking valves 29, 38 are each urged by their spring into their blocking position, so that the outlet 32 is hydraulically blocked. Thus the first consumer connection is also hydraulically blocked by the first blocking valve 29 and the seat valve means 26 in the second magnet valve 13, while the second consumer connection 36 is blocked by the second blocking valve 38 and by the seat valve means 26 in the first magnet valve 12. The piston rod 78 in the double-acting consumer 11 is thus hydraulically blocked.

In the second, raising work position, which here corresponds to a an extension of the piston rod 78 from the consumer 11, the proportional magnet 14 of the first magnet valve 12 is supplied with current, and as a result a proportional regulation of volumetric flow to the consumer 11 is possible. The magnet 15 at the second magnet valve 13 remains currentless in the process. If the first magnet valve 12 is shifted into its work position 18, then it connects the inlet connection 19 with the first motor connection 24, so that pressure fluid can flow from the adjusting pump 21 via the magnet valve 12 into the first work conduit 27 and via the opening blocking valve 29 to the first consumer connection 28 and thus into the cylinder chamber of the consumer 11. The first blocking valve 29 here acts purely as a check valve, since its control connection 33 is relieved to the tank via the first control line 34, a portion of the second work conduit 37, and the second magnet valve 13. At the same time, the second magnet valve 13 blocks off the second lowering conduit 41, with its seat valve means 26. Pressure fluid from the annular chamber of the consumer 11 flows via the second consumer connection 36 and the first lowering conduit 35 to the second motor connection 25 on the first magnet valve 12, from which it is removed to the tank 23. The pressure prevailing between the first magnet valve 12 and the first blocking valve 29 in the first work conduit 27 also builds up via the second control line 39 in the control connection 33 of the second blocking valve 38, and as a result this valve acts as a blocked check valve and blocks off its outlet 32 from the inlet 31. The pressure prevailing in the first work conduit 27 passes via the pressure connection 44 into the alternating valve 42, whose other pressure connection 45 is relieved to the tank. The slide 43 of the alternating valve 42 migrates to its right-hand terminal position, and the pressure from the first pressure connection 44 is carried via the middle connection 46 to the load pressure line to the adjusting pump 21, while the tank connection 47 is blocked. The control device 10 can thus function as an LS system in a known manner.

Upon deflection of the magnet valve 12 to the raising position or work position 18, the force of the proportional magnet 14 would not suffice for the direct control of the hydraulic power in question here. For this reason, the main control member 57 requires an additional drive, which is embodied here in the manner of a followup controller. The pilot control member 58 disposed in the main control member 57 is embodied in pressure equilibrium for this purpose, and in FIG. 2 it is deflected into its work position 18, or in other words to the left in FIG. 2, by the armature 59 of the proportional magnet 14 solely counter to the force of the spring 16.

In the process, its pilot control cone 73 opens the communication from the pressure chamber 61 to the return chamber 54 via the pilot control member 58 and the transverse bores 77. While the pilot control cone 73 takes on the task of tight blocking, the slide edge 72 on the pilot control member 58 assures fine control of this control oil flow, so as to control the pressure in the pressure chamber 61 continuously. If this control oil connection is opened via the slide edge 72 and the pilot control cone 73, then the pressure in the pressure chamber 61 drops, and hence the closing force on the main control member 57 drops as well. The load pressure in the second motor chamber 56, acting upon the first differential face 63, and the inlet pressure in the inlet chamber 52 acting upon the second differential face 69 move the main control member 57 to the left in terms of FIG. 2. In a manner known per se, the main control member 57 follows the pilot control member 58 in the manner of a followup controller. In this opening motion, the main valve cone 59 lifts up from the valve seat 60 fixed to the housing, and it connects the second motor chamber 56 to the intermediate 55, which in turn is relieved to the return chamber 54 via the fine-control chambers 65. The magnitude of the volumetric flow from the second motor connection 25 to the return connection 22 is regulated continuously and hence proportionally to the current value at the magnet 14. In this opening motion of the main control member 57, its third control edge 71 on the second piston portion 66 blocks off the communication from the first motor chamber 53 to the return chamber 54, while at the same time the second control edge 67 opens up the communication from the inlet chamber 52 to the first motor chamber 53. The magnitude of the volumetric flow is controlled by the fine-control grooves 68. During this control operation, the higher pressure is selected for operation of the main control member 57, by means of the two small check valves 75 and 76, which are each in series with two associated inlet throttles 79. This higher pressure is either the pump pressure in the inlet chamber 52 or the load pressure in the second motor chamber 56, above all if a pulling load predominates. This higher pressure always acts upon the large pressure face 62 and produces the closing force there. In the "raising" position, the volumetric flow to and from the double-acting consumer 11 is thus controlled with the first magnet valve 12. The work position 18 extends over a portion of the stroke of the main control member 57, so that the volumetric flow is controllable in proportion to the current value at the magnet 14.

In the third, lowering, position, which corresponds to a retraction of the piston rod 78 of the consumer 11, only the second magnet valve 13 is actuated, while the first magnet valve 12 is not excited. The volumetric flow is then in the correspondingly opposite direction to or from the double-acting consumer 11. Pressure fluid is directed by the adjusting pump 21 to the second consumer connection 36 and on into the annular chamber of the consumer 11 via the second magnet valve 13, which is in its work position 18, the second work conduit 37, and the second blocking valve 38 acting as a check valve. At the same time, pressure fluid flows away to the tank 23 from the cylinder chamber of the consumer 11, via the first consumer connection 28 and the second lowering conduit 41 as well as the second magnet valve 13. The first blocking valve 29 then functions as a blocked check valve, while the alternating valve 42 assumes its other terminal position and connects the pressure connection 45 with the middle connection 46 and hence with the adjusting pump 21. The second magnet valve 13 functions in the same way as the structurally identical first magnet valve 12, in the manner of the followup controller described.

For the fourth position of the control device 10, namely the free-float position, the magnets 14, 15 of the two magnet valves 12, 13 are simultaneously supplied with maximum current and thus deflected to their work positions 18. The same pressure then prevails in the two work conduits 27 and 37 in their portions upstream of the respective blocking valves 29 and 38. This pressure, via the crossing control lines 34 and 39, is present at the control connections 33 of the two blocking valves 29 and 38, causing them to act as blocked check valves. Because of the pressure equality, the slide 43 of the alternating valve 42 also remains in the middle position shown, so that the middle connection 46 is relieved to the tank connection 47, while the pressure connections 44, 45 are blocked. This means there is no LS signal to the pressure supply of the adjusting pump 21 and hence no increase in the pressure. The two lowering conduits 35 and 41 are relieved to the tank by the associated magnet valves 12 and 13, respectively, so that free-float conditions exist for the double-acting consumer 11.

With the control device 10, a single-acting function can be realized as well, for instance if instead of the double-acting consumer 11 a single-acting consumer is connected only to the first consumer connection 28, while the second consumer connection 36 is unused. The neutral position can then be attained as before, if both magnets 14, 15 are not excited. A raising position can be attained by supplying current to the first magnet valve 12 only. The lowering position can be attained by supplying current to both magnet valves 12, 13, with the valve 13 being deflected only in accordance with the desired lowering current.

With the present control device 10, along with a double-acting function, a single-acting function can accordingly be realized; if two magnets are used, a total of four work positions are possible. The control device 10 then functions without a separate control pressure supply and, because of its seat valve means, it operates with little leakage. On free-float or lowering in a single-acting function, no unblocking pressure and hence no raising of pump pressure is necessary. Because of the slide drives chosen, the magnet valves 12, 13 can attain short response times, so that the control device 10 has good regulating performance.

Figure 3:
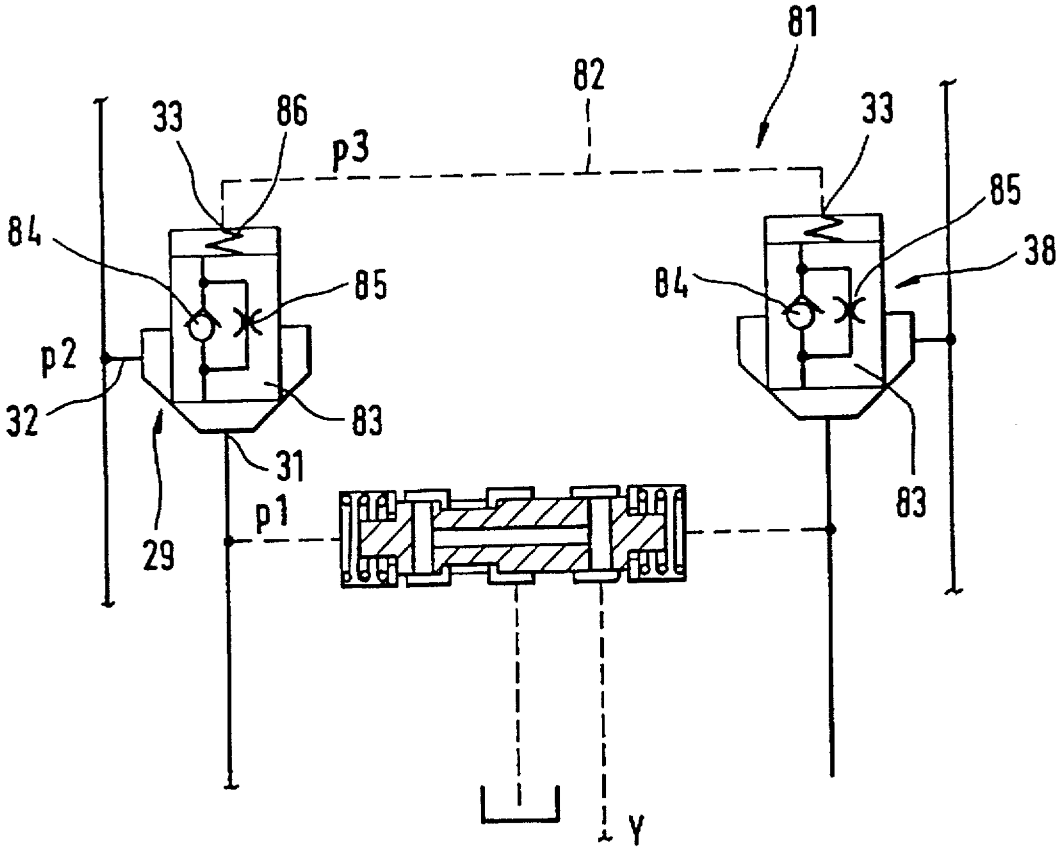
FIG. 3 is simplified control circuit of a portion of the control device of FIG. 1 including the blocking valves.

FIG. 3 schematically shows a portion of the control device 10 having the blocking valves 29, 38, which differ from one another by a simplified control line circuit 81. To avoid the crossing of the control lines 34, 39 as shown in FIG. 1, because the development of such a course is undesirable in a valve housing, in FIG. 3 the control line circuit 81 has a main control line 82, which connects the two control connections 33 of the two blocking valves 39, 38 with one another. The valve bodies 83 of both blocking valves 29, 38 also each contain a small check valve 84, and a throttle 85 is provided parallel to the check valve. The small check valve 84 in the valve body 83 serves to allow the blocking valve 29 or 38 itself to function as a simple check valve on switching of a magnet valve 12 or 13, and it must therefore open relatively fast. Via the parallel throttles 85, the blocking pressures can now be passed through the valve cone 83 to its back side, thus averting a crossing of the lines. If only one magnet valve, such as 12, is actuated, then the pressure p1 in the inlet 31 is greater than the pressure p3 in the control connection 33, and the blocking valve 29 itself operates as a check valve, and the valve body 83 lifts from the seat. If both magnet valves 12 and 13 are actuated simultaneously, then the pressures p1 and p3 are of equal magnitude, so that an associated spring 86 keeps the valve body 83 closed. The control line circuit 81 is simplified substantially by making do with only a single main control line 82. This function of the blocking valves 29 and 38 is still preserved if there is a throttle 85 disposed in only one of the two valve bodies 83.

Figure 4:
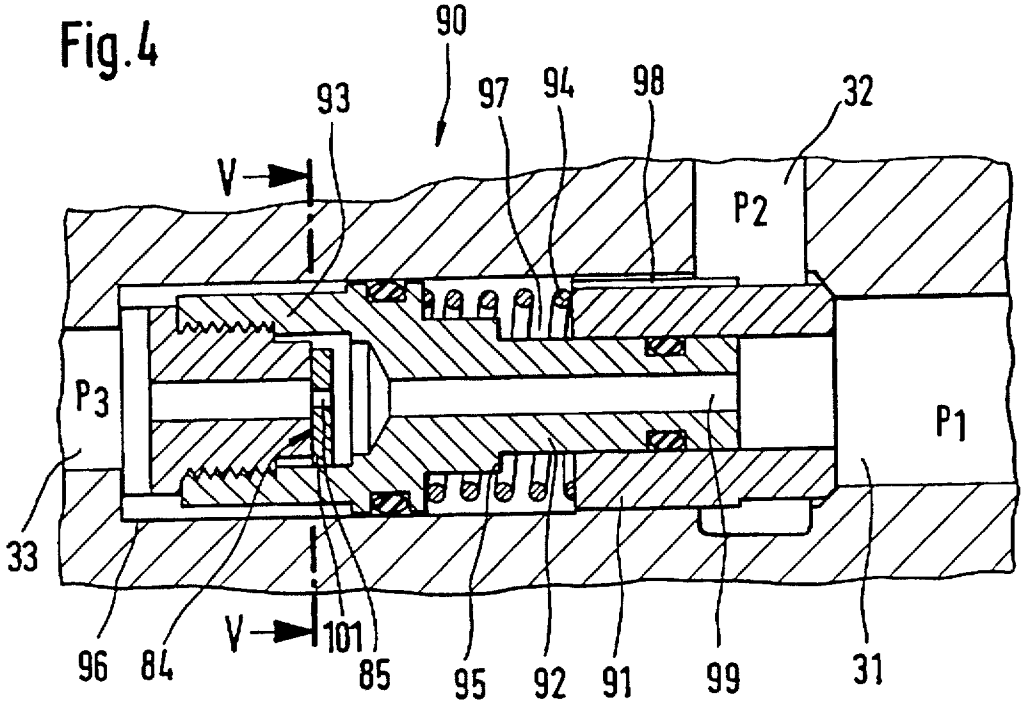
FIG. 4 is a detailed longitudinal cross-sectional view through a single blocking valve of a simple structural design.
Figure 5:
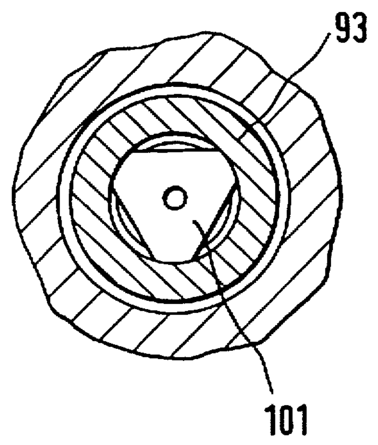
FIG. 5 is a detailed cross-sectional view through the device shown in FIG. 4 taken along the section line V—V in FIG. 4.

FIG. 4 shows a longitudinal section through a structurally embodied blocking valve 90, with which the functions of the blocking valve 29 shown schematically in FIG. 3 can be executed. The valve bodies schematically shown in FIGS. 1 and 3 are embodied such that the ratio of their seat diameter to their shaft diameter is 1. A prerequisite of such an embodiment is hardened valve seats, which is unfavorable for a version of the control valve 10 in a cast metal housing. In order therefore to make it easier to attain the function of the blocking valve 29 of FIG. 3 in a cast metal housing, the structurally embodied blocking valve 90 of FIG. 4 is embodied as a differential face valve, which does not require an exact seat diameter but instead works with a relatively broad seat geometry and therefore makes do with a low pressure per unit of surface area in the cast metal housing. For the embodiment as a differential face valve, the blocking valve 90 has a tubular valve body 91, which controls the communication from the inlet 31 to the outlet 32 and is guided tightly and slidingly on a boltlike extension 92 of a blocking piston 93. The valve body 91 is braced via a spring 94 against the blocking piston 93, on whose extension 92 a collar 95 is formed. The blocking piston 93 is tightly and slidingly guided in a housing bore 96 and defines a chamber 97 that receives the spring 94 and that communicates with the outlet 32 via a throttle groove 98. A passage 99 leading from the inlet 31 to the control connection 33 is formed in the blocking piston 93, and a throttle check valve known per se is also incorporated in this passage. The function of the check valve 84 of FIG. 3 is taken over by a triangular disk 101, in which the throttle 85 is embodied centrally as a small bore. In the cross section of FIG. 5, the shape of this triangular disk 101 can clearly be seen.

With this blocking valve 90 of FIG. 4, the function of the blocking valve 29 of FIG. 3 can be attained structurally, with only a single main control line 82 leading away from the control connection 33. In this blocking valve 90, if the control connection 33 is relieved and if p3 is equal to 0, then upon a volumetric flow arriving at the inlet 31, the valve body 91 will open and, if the pressure of p1 is larger, direct the volumetric flow into the outlet 32, whose pressure p2 is lower than p1. Conversely, if the control connection 33 is acted upon, and if its pressure p3 is of equal magnitude to the pressure p1 in the inlet 31, then the blocking valve 90 blocks the communication with the outlet 32. The blocking piston 93 is displaced counter to the force of the spring 94 by the pressure in the control connection 33 and is braced by its collar 95 on the tubular valve body 91, as a result of which this valve body is pressed against the associated valve seat solidly attached to the housing.

Figure 6:
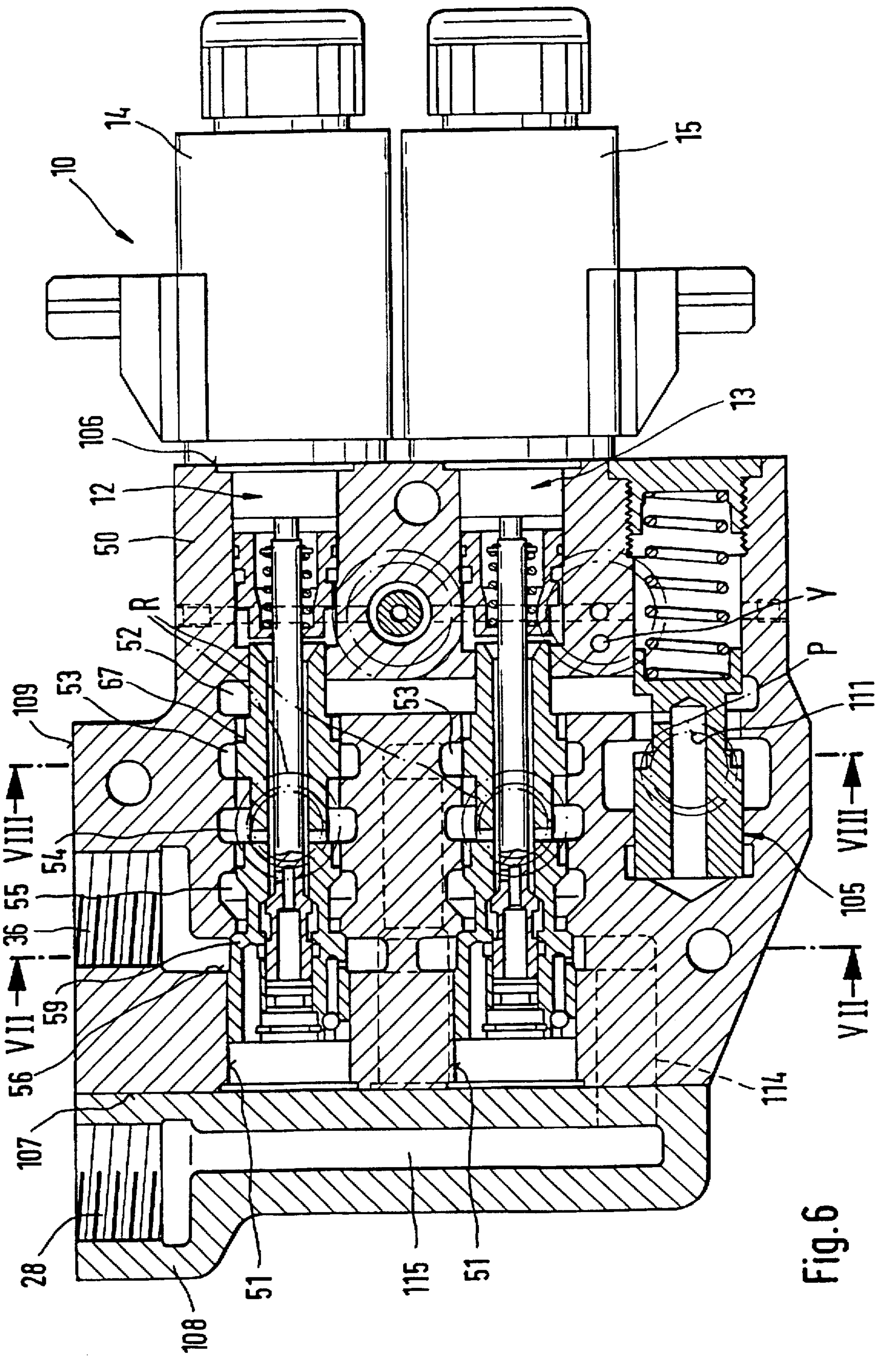
FIG. 6 is a longitudinal cross-sectional view through the control device of FIG. 1 taken along the sectional line VI—VI in FIG. 7.

FIG. 6, in the form of a longitudinal section, now shows the structural design of the control device 10 of FIG. 1; identical components to those of FIGS. 1–5 are again provided with the same reference numerals. In the control device of FIG. 6, in addition to the control device shown schematically in FIG. 1, an individual pressure compensating valve 105 is provided in the housing 50; it is preceded by the two magnet valves 12 and 13. For explanation of the control device of FIG. 6, reference is made to FIGS. 7–9, which show cross sections taken through the lines VII—VII, VIII—VIII of FIG. 6 and a section taken along the line IX—IX of FIG. 7. Moreover, the precise course of the longitudinal section of FIG. 6 is represented by the line VI—VI of FIG. 7.

In the control device 10 of FIG. 6, the housing 50 is essentially parallelepiped in shape, since the device is designed for a disk type of design in an LS system. In the housing, the two magnet valves 12 and 13 are disposed with their longitudinal axes parallel to one another, in such a way that both proportional magnets 14, 15 are mounted on one end face 106. Because of the joint disposition of both magnets on one side, the control device 10 is also especially advantageous for a mechanical actuation. On the housing 50 opposite the end face 106, a flat installation face 107 is formed, toward which the two continuous, repeatedly offset slide bores 51 of both magnet valves 12, 13 open. The installation face 107 is covered by a cap 108, in which the first consumer connection 28 is formed, while the second consumer connection 36 is located in the housing 50 itself. Both consumer connections 28, 36 are open toward one surface 109. In the slide bore 51 located closer to the surface 109 in the housing 50, the first magnet valve is provided, while the second magnet valve 13 is located in the slide bore 51 below it. As can be seen in more detail in FIG. 6, the inlet chambers 52 of both magnet valves 12, 13 communicate with one another and also lead into the pressure compensating valve 105, which can be supplied with pressure fluid by the adjusting pump 21 via the pump connection 111.

Figure 7:
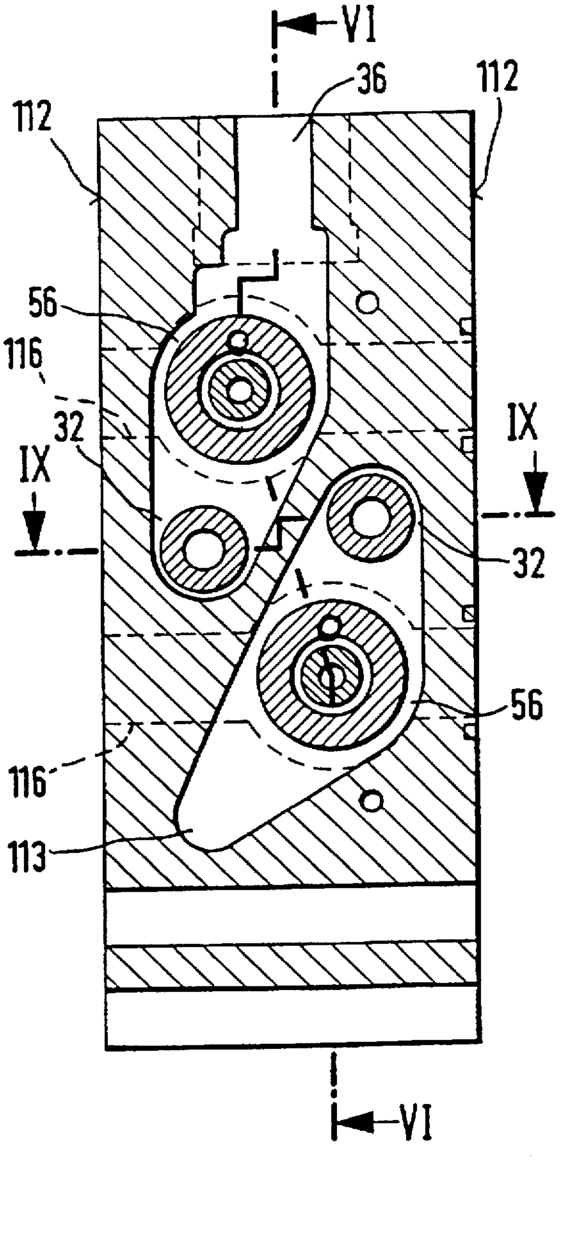
FIG. 7 is a cross-sectional view of the control device of FIG. 1 taken along the section line VII—VII of FIG. 6.
Figure 8:
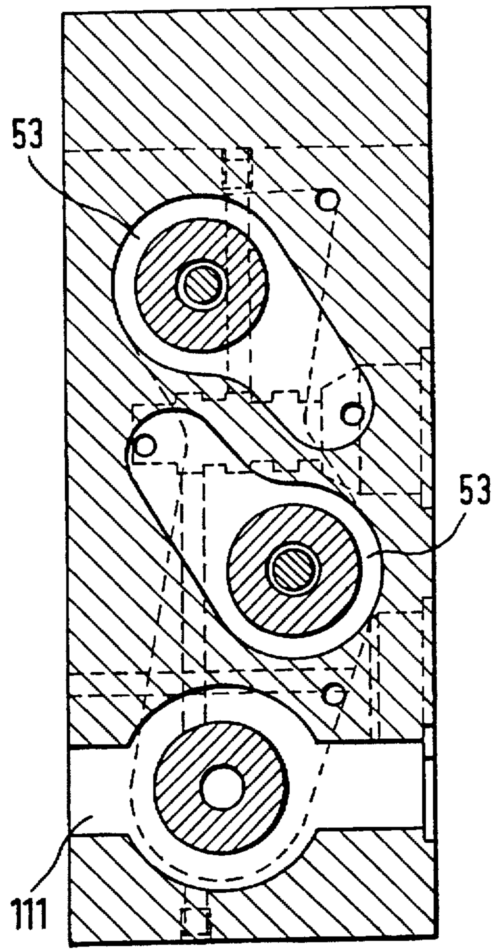
FIG. 8 is a cross-sectional view through the control device of FIG. 1 taken along the sectional line VIII—VIII of FIG. 6.
Figure 9:
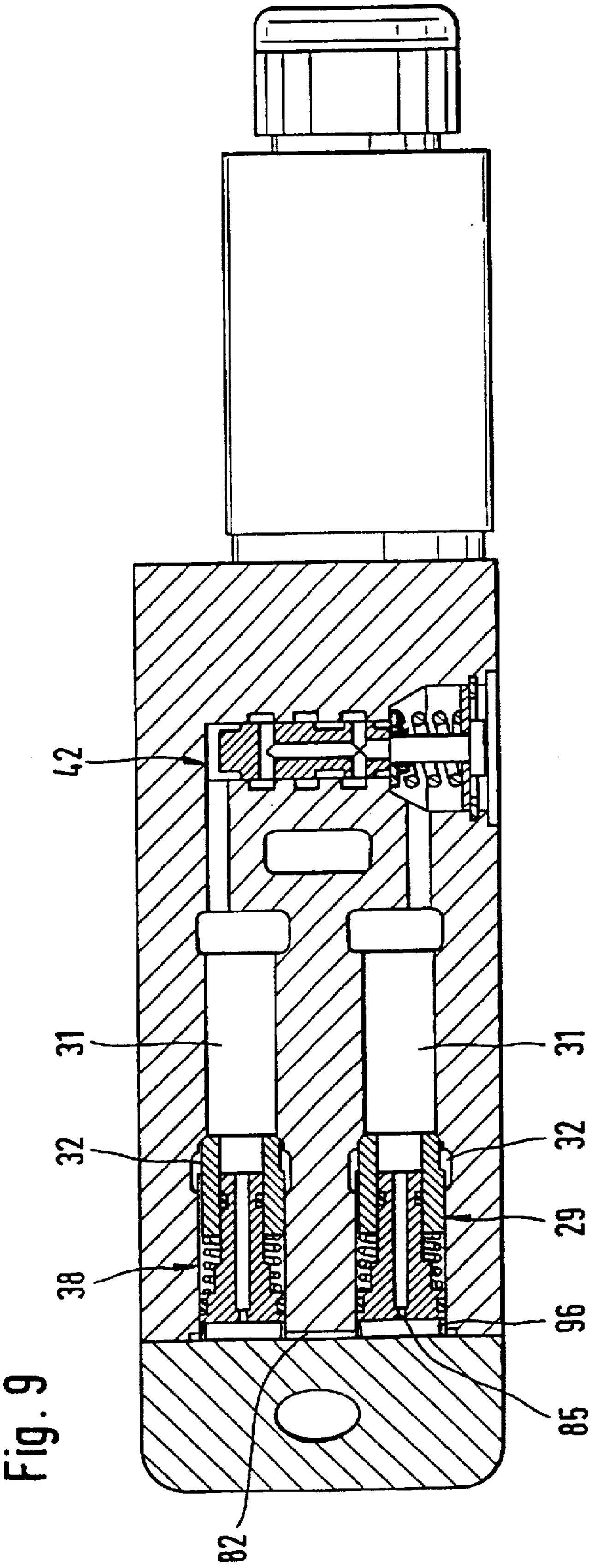
FIG. 9 is a cross-sectional view taken along the section line IX—IX of FIG. 7.

As FIGS. 7 and 8 show in more detail, the magnet valves 12 and 13 are located in different longitudinal planes, which extend parallel to the flange faces 112 of the housing 50. Because of the spaced-apart longitudinal planes through the magnet valves 12, 13, these valves can be disposed closer together in terms of height, which makes a compact design and short conduits possible. As FIG. 7 in combination with FIG. 9 shows in more detail, the two blocking valves 29, 38 and the alternating valve 42 are located in a region of the housing 50 that extends between the two magnet valves 12 and 13. It can be seen from FIG. 7 that the distance between the longitudinal planes extending through the blocking valves 29 and 38 is still considerably greater than the distance between the longitudinal planes through the magnet valves 12, 13. Moreover, the blocking valves 29 and 38 are offset in height relative to one another, to enable an especially compact design. It is clearly shown in FIG. 7 that the second consumer connection 36 communicates with the second motor chamber 56 of the first magnet valve 12 and also communicates with the outlet 32 of the second blocking valve 38. In the same sectional plane, the second motor chamber 56 of the second multiposition valve 13 also communicates at the top with the outlet 32 of the first blocking valve 29, and at the same time it communicates with the first consumer connection 28, via a lower bay 113, via a transverse conduit 114 and a vertically extending work conduit 115.

As also seen from FIG. 8, the first motor chamber 53 of the first magnet valve 12 has a kidney-shaped bay protruding obliquely downward, so that it communicates with the inlet 13 of the first blocking valve 29, as shown in further detail in FIG. 9. Correspondingly, the first motor chamber 53 of the second magnet valve 13 has a kidney-shaped bay protruding obliquely upward, so that it communicates with the inlet 31 of the second blocking valve 38, as shown in detail in FIG. 9. The return chambers 54 of both magnet valves 12 and 13 communicate with one another via continuous return conduits 116 and a connection or end plate not shown in further detail. The pump conduit 111 penetrates the housing 50 in the same way as the return conduits 116.

As seen from FIG. 6 in combination with FIG. 9, what this arrangement of the magnet valves 12 and 13 and the blocking valves 29 and 38 attains is that all the valve seats fixed in the housing, in the two slide bores 51 of the magnet valves 12 and 13 and in the housing bores 96 for the blocking valves 29 and 38, are open toward the installation face 107 and can readily be machined from there. With the structural version of the control device 10 of FIG. 6, all the functions and advantages described in conjunction with the control device of FIG. 1 can be attained. Moreover, the spatial arrangement of the two magnet valves 12, 13, the two blocking valves 29, 38 and the alternating valve 42 in the housing 50 results in an extremely space-saving, compact design that is especially suitable for mobile applications. As also seen from FIG. 9, in the case of the blocking valves 29 and 38 the function of the disklike check valve 101 can also be dispensed with entirely, so that only the throttle restriction 85 is provided. The blocking valves 29 and 38 can continue to perform their function then, but the pressure in the intervening main control line 82 in that case is only half as high as the load pressure.

The mode of operation of the control device 10 of FIG. 6 is fundamentally the same as that of FIG. 1, and the mode of operation of the magnet valve 12 of FIG. 2 and the blocking valve 90 of FIG. 4 are also referred to expressly here. Therefore the following description will merely briefly discuss the flow course in the housing 50 that arises in the raising and lowering positions. If in the raising position only the magnet valve 12 is actuated, then the volumetric flow flowing from the pump conduit 111 into the inlet chamber 52 via the pressure compensating valve 105 reaches the first motor chamber 53 via the second control edge 67. As seen in FIG. 8, the volumetric flow there enters the lower kidney-shaped recess and from there can reach the inlet 31 of the second blocking valve 29, as can be seen from FIG. 9. This blocking valve 29 opens the communication with its outlet 32, from whence the volumetric flow—as can be seen from FIG. 7—flows via the second motor chamber 56 of the second magnet valve 13 farther downward into the pocket-like bay 113, from whence it reaches the first consumer connection 28 via the transverse conduit 114 and the work conduit 115 in the cap 108. At the same time, the volumetric flow returning from the consumer is deflected into the second consumer connection 36, from whence it can reach the return chamber 54, via the second motor chamber 56 of the first magnet valve 12 and its opened main valve cone 59, via the intermediate chamber 55 and the fine-control chambers 65. As also shown in more detail in FIG. 7, this returning volumetric flow also reaches the outlet 32 of the second blocking valve 38, which however, because of the imposition of pressure via the main control line 82, acts as a blocked check valve and blocks the communication with its inlet 31.

If in the lowering position only the second magnet valve 13 is actuated, then the volumetric flow arriving via the pressure compensating valve 105 flows from the common inlet chamber 52 into the first motor chamber 53 of the second multiposition valve 13. As FIG. 8 shows in more detail, the volumetric flow from there passes via the obliquely upward-pointing bay in the first motor chamber 53 to reach the inlet 31 of the second blocking valve 38. This valve functions as a check valve and opens the communication with its outlet 32, from whence—as FIG. 7 shows in detail—the volumetric flow moves past the second motor chamber 56 of the first magnet valve 12 to the first consumer connection 36 and from there flows to the consumer 11. The volumetric flow leaving the consumer 11 passes via the first consumer connection 28, the work conduits 115 and 114, to reach the pocketlike bay 113 and flows on into the second motor chamber 56 of the second magnet valve 13, by way of whose opened main valve cone the flow of pressure fluid can likewise flow away to the return chamber 54 via the intermediate chamber 55. The other functions of the alternating valve 42 and the volumetric flows in the free-float position can be seen from FIG. 1.

Figure 10:
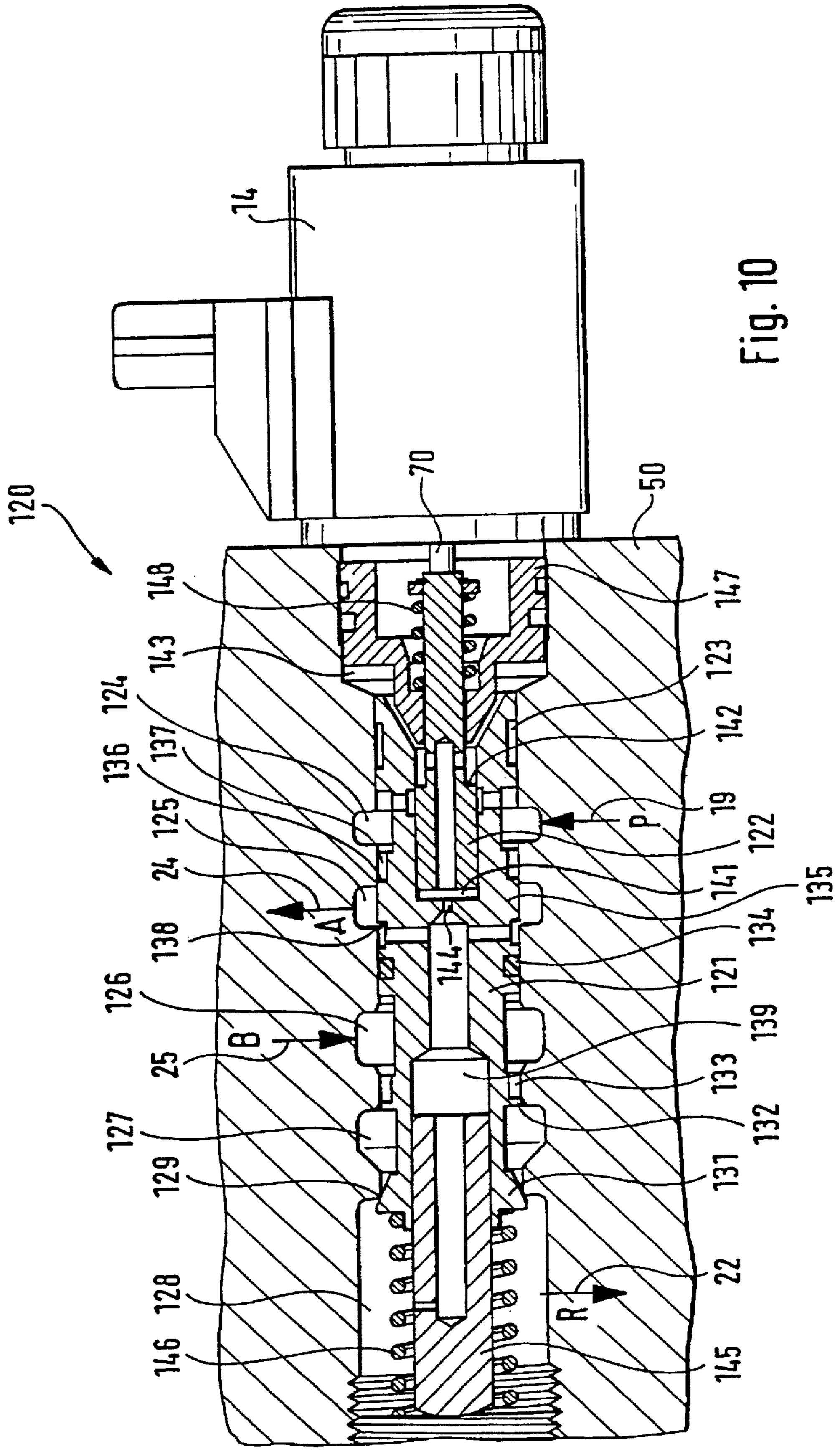
FIG. 10 is a cross-sectional view through another embodiment of a proportional magnet valve for use in the control device of FIG. 1.

FIG. 10 shows a longitudinal section through another structural embodiment of a magnet valve 120, of the kind that can be used in the control device 10 for the schematically shown magnet valves 12 and 13. In terms of its basic design, the magnet valve 120 is comparable to the magnet valve 12 of FIG. 2 in the sense that it has a main control member 121 and a pilot control member 122 disposed therein, which cooperate in the manner of a followup controller; the pilot control member 122 is actuated by the armature 59 of the proportional magnet 14. The magnet valve 120 has a continuous, repeatedly offset slide bore 123 in the housing 50, in which bore an inlet chamber 124, a first motor chamber 125, a second motor chamber 126, an intermediate chamber 127, and a return chamber 128 are formed by annular expansion. The inlet chamber 124 communicates with the inlet connection 19 (P), the first motor chamber 125 communicates with the first motor connection 24 (A), the second motor chamber 126 correspondingly communicates with the second motor connection 25 (B), and the return chamber 128 communicates with the return connection 22 (R). In the region between the intermediate chamber 127 and the return chamber 128, a valve seat 129 fixed in the housing is formed, which cooperates with a main valve cone 131 that is disposed on the end of the main control member 121 remote from the magnet 14. Spaced apart from that, the main control member 121 has a first piston portion 132 with fine-control notches 133, which control the communication between the intermediate chamber 127 and the second motor chamber 126. The second motor chamber 126 is also sealed off by an O-ring 134 in the main control member 121. On a second piston portion 135 in the region of the first motor chamber 125, a second control edge 136 is provided, with adjoining fine-control grooves 137 that control the communication from the inlet chamber 124 to the first motor chamber 125. A third control edge 138 on the second piston portion 135 serves to relieve the first motor chamber 125; this relief is effected into the return chamber 128 via a recess 139. With a slide edge 142, the pilot control member 122, protruding into a blind bore 141 of the main control member 121, controls a communication from the inlet chamber 124 to a face-end pressure chamber 143, into which the end of the main control member 121 toward the magnet 14 protrudes. Via a main throttle bore 144, the blind bore 141 communicates with the recess 139, into which a damping piston 145 is fitted. A main spring 146 disposed in the return chamber 128 presses the main control member 121 into its initial position 17, in which its main valve cone 131 is braced against the valve seat 129 fixed in the housing. A ring insert 147 is also installed fixed in the housing on the side of the magnet 14 in a widened portion of the slide bore 123. A spring 148 is braced against this insert and on its other end presses the pilot control member 122 against the armature 59 of the magnet 14.

In principle, the mode of operation of the magnet valve 120 is similar to that of the magnet valve 12 of FIG. 2. When the magnet 14 is not excited, the switching connections shown for the magnet valve 12 in FIG. 1 are attained, in which the second motor connection 25 is tightly blocked off by the main valve cone 131 and thereby attains the seat valve function 26. The O-ring 134, which may also be embodied as a slide ring or piston ring, serves to seal off the second motor connection 25 from the first motor chamber 125. A longer narrow gap at this point would also be possible as a seal. Supplying current to the magnet 14 deflects the magnet valve 120 into a work position 18, in which the pilot control member 122 and the main control member 121 cooperate in the manner of a followup controller. The pilot control member 122 is in pressure-equilibrium, so that the armature 59 needs to overcome only the force of the spring 147. Via the slide edge 142, the pilot control member 122 can raise the pressure in the pressure chamber 143, so that the opening force on the main control member 121 predominates, and the main control member is pressed to the left into its work position counter to the force of the main spring 146. In this process, the main valve cone 131 lifts away from its assigned seat 129, and with the fine-control notches 133 that then open, the magnitude of the volumetric flow leaving the second motor chamber 126 for the return 22 via the intermediate chamber 127 is regulated. It is understood that this control of the volumetric flow is proportional to the magnitude of the current signal at the proportional magnet 14. Simultaneously with this opening motion, the communication from the first motor chamber 125 to the return 22 via the recess 139 is closed by the third control edge 138, while at the same time the second control edge 136 opens the communication to the inlet 19. Via the fine-control grooves 137, the volumetric flow from the inlet chamber 124 to the first motor chamber 125 can be regulated in its magnitude. The pressure in the pressure chamber 143, whose magnitude effects the opening motion of the main control member 121, is reduced by means of a control oil flow that flows away continuously to the return 22 via the throttle bore 144. The damping piston 145 assures uniform, damped motions of the main control member 121.

The magnet valve 120 of FIG. 10, in a similar way to the magnet valve 12 of FIG. 2, can be disposed in a housing 50 together with the other functional elements in such a way that the same action and advantages as in the control device of FIG. 6 are attained.

It is understood that modifications of the embodiments shown may be made without departing from the concept of the invention.

What is claimed is:

1. An electrohydraulic control device for a double-acting consumer, said electrohydraulic control device comprising a first consumer connection (28) to the double-acting consumer (11), a second consumer connection (36) to the double-acting consumer (11), a first work conduit (27) communicating with the first consumer connection (28) and including a first blocking valve (29) for blocking the first consumer connection (28), a second work conduit (37) communicating with the second consumer connection (36) and including a second blocking valve (38) for blocking said second consumer connection (36), a first lowering conduit (35) communicating with the second consumer connection (36) and a second lowering conduit (41) communicating with the first consumer connection (28), each of said lowering conduits by-passing the blocking valves (29,38); and electromagnetically actuable control means for blocking or connecting at least one of the consumer connections, said control means comprising a first four-way, two-position proportional magnet valve (12; 120) and a second four-way, two-position proportional magnet valve (13; 120) identical to said first four-way, two position proportional magnet valve, wherein each of said magnet valves includes a slidable valve control member provided with control edges (67,71), an inlet connection (19), a return connection (22), a first motor connection (24) alternatively connected to the inlet connection (19) or the return connection (22) by operation of the slidable valve member with the control edges (67,71), a second motor connection (25) and seat valve means (26) for controlling the second motor connection; and wherein the first motor connection (24) of the first magnet valve (12; 120) communicates with the first work conduit (27), the first motor connection (24) of the second magnet valve (13; 120) communicates with the second work conduit (37), the second motor connection (25) of the first magnet valve (12; 120) is connected with the first lowering conduit (35), the second motor connection (25) of the second magnet valve (13;120) is connected with the second lowering conduit (41), and each of said magnet valves has an initial position (17) in which said work conduit connected thereto is relieved.

2. The electrohydraulic control device as defined in claim 1, wherein for each of the magnet valves the second motor connection (25) is blocked by the seat valve means (26) and the inlet connection (19) is blocked by the slidable valve control member in the initial position (17) and the slidable valve control member has a work position (18) in which the inlet connection (19) communicates with the first motor connection (24) and the second motor connection (25) communicates with the return connection (22).

3. The electrohydraulic control device as defined in claim 1, wherein each of the slidable valve control members comprises a longitudinally movable main control member (57); each of the magnetic valves (12, 13; 120) comprises a pilot-controlled valve including the main control member (57), a proportional magnet (14,15) and a pilot control member (58, 122) actuable by the proportional magnet (14,15) to cooperate with the main control member so as to act as a followup controller; and the seat valve means (26) includes a main valve cone (59) disposed on said main control member (57) for blocking the second motor connection (25) and is connected in series with a fine-control edge (65) provided on said main control member (57) for communication with the return connection and said control edges (67,71) are disposed on said main control member (57) spatially separated from each other.

4. The electrohydraulic control device as defined in claim 3, wherein the main control member (57) has a thickened end portion having an end face defining an end-face pressure chamber (61), said end-face pressure chamber adjoining the main control member (57) so that a pressure in said pressure chamber urges the main control member (57) in a closing direction; the pilot-controlled valve includes means for relieving the end-face pressure chamber (61) including a slide edge (72), a pilot control cone (73) connected in series with the slide edge (72), said slide edge and said pilot control cone being provided on the pilot control member (58), and a spring (16) arranged to urge the pilot control member (58) in a direction opposite to another direction of motion of the pilot control member caused by operation of the proportional magnet (14,15); and the main control member (57) has at least one differential face (63) and said main control member (57) is urged in an opening direction by a pressure at the second motor connection (25) acting on the at least one differential face (63).

5. The electrohydraulic control device as defined in claim 4, wherein the main control member (57) has a second differential face (69) and is positionable so that a pressure at said inlet connection (19) acts on said second differential face (69) urging the main control member (57) in an opening direction and the pilot-controlled valve includes means for connecting the end-face pressure chamber (61) with the second motor connection (25) or the inlet connection (19) so that the end-face pressure chamber (61) is selectively acted on by a higher pressure at the second motor connection (25) or the inlet connection (19), and the means for connecting includes check valves (75,76) and inlet throttles (79).

6. The electrohydraulic control device as defined in claim 3, wherein the pilot-controlled valve is provided with a slide bore (51) for the main control member (57) and said slide bore (51) includes an inlet chamber (52), a first motor chamber (53), a return chamber (54), an intermediate chamber (55) and a second motor chamber (56) arranged in succession spaced from each other along said slide bore (51) with said inlet chamber (52) being closest to said proportional magnet (14,15) and said second motor chamber (56) being furthest from said proportional magnet (14,15), and said connections (19, 22, 24 and 25) are assigned to respective ones of said chambers of said slide bore.

7. The electrohydraulic control device as defined in claim 3, wherein the pilot-controlled valve has a housing and is provided with a slide bore (123) through which said main control member (121) moves, said slide bore including a return chamber (128), a second motor chamber (126), a first motor chamber (125), an inlet chamber (124) and a magnetic-end pressure chamber (143) arranged in succession with the magnet-end pressure chamber (143) closest to the proportional magnet (14,15) and the return chamber (128) furthest from the proportional magnet (14,15); the main valve cone (131) controls communication with the return chamber (128); a spring (146) is provided in the return chamber (128) and is arranged to urge the main control member (121) towards the initial position and to press the main valve cone (131) against a valve seat (129) fixed in the housing of the pilot-controlled valve; the magnet-end pressure chamber (143) is bounded by an end of the main control member (121) closest to said proportional magnet (14,15) so that a pressure in the magnet-end pressure chamber (143) urges the main control member (121) in a direction toward a work position (18) against action of said spring (146); said magnet-end pressure chamber (143) is connected to the return connection (22) via a throttle bore (144) and is connected with the return connection (22) by means of the pilot control member (122) and the proportional magnet (14,15) is provided with an armature (59) and another spring (147) braced against the housing and holding the pilot control member (122) against the armature (59) of the proportional magnet (14).

8. The electrohydraulic control device as defined in claim 7, wherein the main control member (121) is provided with a throttle bore (144) and a damping piston (145) guided slidably in the throttle bore (144), protruding into the return chamber (128) and provided with a return throttle.

9. The electrohydraulic control device as defined in claim 7, wherein the first motor chamber (125) is arranged side-by-side of the second motor chamber (126), the inlet chamber (124) is located between the first motor chamber (125) and the proportional magnet (140) and an intermediate chamber (127) is located between the second motor chamber (126) and the return chamber (128).

10. The electrohydraulic control device as defined in claim 1, wherein said two blocking valves (29, 38) each have an inlet-side inlet (31), a spring-loaded back end, a control connection (33) communicating with the spring-loaded back end and means for transmitting a pressure prevailing at the inlet-side inlet (31) of one of the two blocking valves to the control connection (33) of another of the two blocking valves and thus to the spring-loaded back end thereof so as to block said another of the two blocking valves.

11. The electrohydraulic control device as defined in claim 10, wherein each of the blocking valves (29,38) is provided with a throttle check valve (84,85) and the control connections (33) of both of said blocking valves (29,38) are connected with each other via a blocking valve control line (82) so that said pressure prevailing at the inlet-side inlet of said one of said two blocking valves is transmitted through said one of said two blocking valves via said throttle check valve and through said blocking valve control line to said another of the two blocking valves.

12. The electrohydraulic control device as defined in claim 11, wherein each of said blocking valves includes a blocking piston (93) with a bolt-like extension (92), a tubular valve body (91) guided slidingly on the bolt-like extension (92) of the blocking piston (93) and a blocking valve spring (94) braced between the blocking piston (93) and the tubular valve body (91); the blocking piston (93) and the valve body (91) have substantially equal outer diameters; a valve passage (99) extends through each of said blocking valves and said throttle check valve (84,85) is provided in said valve passage (99).

13. The electrohydraulic control device as defined in claim 1, wherein said electromagnetically actuable control means comprises an alternating valve (42) having a spring-centered middle position and connected between the two first motor connections (24) of both of the magnet valves (12,13) and said alternating valve (42) has two opposite end connections (44,45) connected to the respective first motor connections (24) and a middle connection (46) connected to a load pressure line so that on pressurizing one of said two end connections (44,45) of the alternating valve (42) a maximum pressure is transmitted into said load-pressure line.

14. The control device as defined in claim 13, wherein said control means has a substantially parallelepiped housing (50) provided with an end face (106) and said two magnet valves (12,13) have respective longitudinal axes and are arranged so that said longitudinal axes extend parallel to one another and said proportional magnets (14,15) are arranged on said end face (106).

15. The control device as defined in claim 14, wherein the housing (50) has an installation face (107) opposite from said end face (106) and a cap (108) covering the installation face (107), and one of the consumer connections is located in the housing (50) and another of the consumer connections is located in the cap (108) and said consumer connections are located on a top side (109) of the control means.

16. The control device as defined in claim 15, wherein a pressure compensating valve (105) is arranged in the housing (50) and a pump conduit (111) extends in the housing (50) below the two magnet valves (12,13).

17. The control device as defined in claim 14, wherein the housing (50) is provided with valve seats (60) assigned to main control members (57) of both of said magnet valves (12,13), axially parallel bores (51,96) open toward an installation face (107) of the housing on a side opposite from the end face (106) and additional valve seats for the blocking valves (29,38) arranged in the axial parallel bores (51,96).

18. The control device as defined in claim 14, wherein the longitudinal axes of the magnet valves (12,13) are arranged in two longitudinal planes parallel to each other and spaced apart from one another.

19. The control device as defined in claim 18, wherein the blocking valves are arranged axially parallel in the housing in different transverse planes, said transverse planes extend spaced apart from each other and parallel to each other and said transverse planes are spaced a distance apart greater than a distance between the longitudinal planes in which the magnet valves are located.

20. The control device as defined in claim 14, wherein the two blocking valves (29,38) and the alternating valve (42) are arranged in the housing (50) in a region between the two magnet valves (12,13).

* * * * *